R. B. BENJAMIN.
CAPLET.
APPLICATION FILED MAR. 10, 1911.
1,086,347.
Patented Feb. 10, 1914.
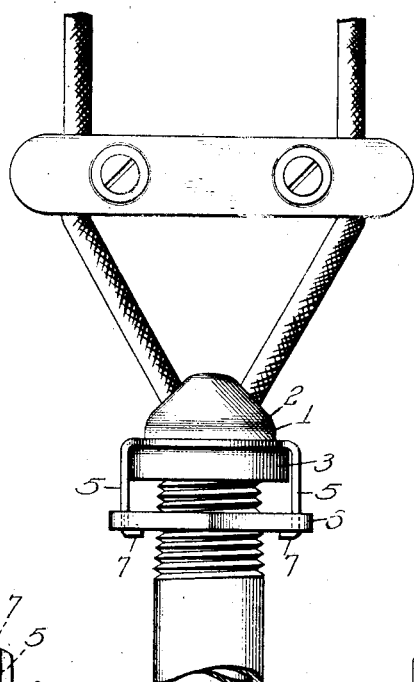
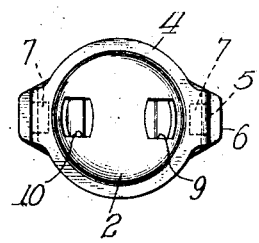
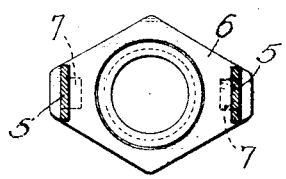
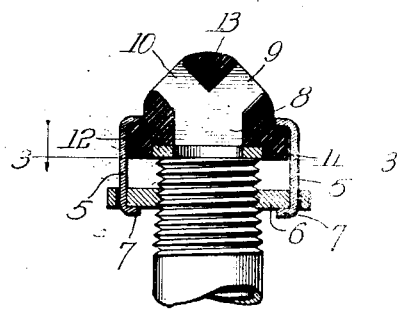
Witnesses:
Robert N. Kerr
Charles G. Cox
Inventor:
Reuben B. Benjamin
By Jones, Addington, Ames & Seibold
Attys.

UNITED STATES PATENT OFFICE.

REUBEN B. BENJAMIN, OF CHICAGO, ILLINOIS, ASSIGNOR TO BENJAMIN ELECTRIC MFG. COMPANY, OF CHICAGO, ILLINOIS, A CORPORATION OF ILLINOIS.

CAPLET.

1,086,347.   Specification of Letters Patent.   Patented Feb. 10, 1914.

Application filed March 10, 1911. Serial No. 613,572.

*To all whom it may concern:*

Be it known that I, REUBEN B. BENJAMIN, a citizen of the United States, residing at Chicago, in the county of Cook and State of Illinois, have invented new and useful Improvements in Caplets, of which the following is a full, clear, concise, and exact description, reference being had to the accompanying drawing, forming a part of this specification.

My invention relates to improvements in closures for the ends of exposed electric wire conduits and particularly the iron conduits used for electric wires.

One of the objects of my invention is to provide a simple and inexpensive fitting which may be connected to the end of a conduit and which will suitably spread or separate the conductors leading out of the end of the conduit and at the same time cover the end of the conduit so that foreign matter cannot enter.

I have illustrated, for the purpose of disclosing my invention, one embodiment thereof in the accompanying drawings.

In said drawings—Figure 1 is a perspective view of a fitting embodying my invention, showing the same attached to the end of a conduit and showing how the same may be used for spreading or separating the conductors; Fig. 2 is a plan view thereof; Fig. 3 is a plan view of the lock nut for securing the fitting in position; and Fig. 4 is a transverse section of the improved fitting.

The improved fitting consists of a porcelain cap and means for securing the same to the end of the conduit. This cap 1 preferably takes the form of a cylindrical body portion having its upper end 2 in the form of a truncated cone and provided at its lower end with an annular flange 3. Fitting over this annular flange is a ring 4 which is preferably of metal and this ring is provided with a pair of downturned ears 5 which engage in suitable slots formed in the ends of the nut 6 and have their ends turned over, as at 7, to connect the nut with the porcelain cap. The cap has formed therein a central opening 8 which ends in two diverging openings 9 and 10 through which the separate wires of the conductor are adapted to be passed. The bottom of the cap is provided with an annular recess 11 in which is arranged to fit a washer 12.

In applying the cap to the end of a conduit before the cap is placed in position, the wires may be drawn through the central opening and spread into the openings 9 and 10, a portion 13 of the cap forming a wedge between the two wires. The cap may then be placed upon the top of a conduit and by screwing the nut home it will be firmly drawn down into position on the conduit, forming practically a water-tight connection with the conduit. The two spread wires may be led off to any position to be connected with any translating or other device, as shown.

Having thus described my invention, what I claim as new and desire to secure by Letters Patent, is—

In a device of the character described, the combination with an insulating cap having diverging openings extending therethrough and provided with an annular flange at its base, of a ring having a central opening through which said cap is arranged to project and adapted to engage said flange, down-turned lugs integrally formed on said ring, and a nut having openings therethrough to receive said lugs, the ends of the lugs being turned over on the under side of the nut to connect the same with the ring.

In witness whereof, I have hereunto subscribed my name in the presence of two witnesses.

REUBEN B. BENJAMIN.

Witnesses:
E. R. KING,
CHARLES G. COPE.